United States Patent [19]

Jantzen

[11] 3,857,531

[45] Dec. 31, 1974

[54] TAPE REEL CARTRIDGE

[75] Inventor: Johannes K. Jantzen, Mountain View, Calif.

[73] Assignee: International Video Corporation, Sunnyvale, Calif.

[22] Filed: Mar. 29, 1973

[21] Appl. No.: 346,945

Related U.S. Application Data

[63] Continuation-in-part of Ser. No. 301,105, Oct. 26, 1972.

[52] U.S. Cl. .................................. 242/197, 360/133

[51] Int. Cl.... G03b 1/04, G11b 15/32, G11b 23/04

[58] Field of Search ............ 242/192, 195, 197–200; 352/72–78; 274/4 B, 11 B; 360/133

[56] References Cited

UNITED STATES PATENTS

| | | | |
|---|---|---|---|
| 3,150,840 | 9/1964 | Briskin | 242/195 |
| 3,628,753 | 12/1971 | Bradt et al. | 242/197 |
| 3,693,907 | 9/1972 | Prelletz | 242/197 |

*Primary Examiner*—Leonard D. Christian
*Attorney, Agent, or Firm*—Limbach, Limbach & Sutton

[57] ABSTRACT

A reel cartridge for a conventional tape reel, the cartridge having an internal guide for confining a wound tape on the reel and for cooperating with an extractor mechanism to permit withdrawal of the end of the tape, the cartridge being removably adaptable to a cooperating spindle with latching fingers by an adapter ring which is fixable to the hub of a contained tape supply reel.

8 Claims, 6 Drawing Figures

TAPE REEL CARTRIDGE

This application is a continuation-in-part of my application Ser. No. 301,105, filed Oct. 26, 1972 and entitled "Tape Reel Cartridge."

BACKGROUND OF THE DISCLOSURE

This invention relates to a tape reel cartridge which is constructed to permit a conventional tape reel to be contained in a protective enclosure and to be adaptable to a latching drive spindle of a tape recorder. The cartridge construction permits the cartridge and contained reel to be easily mounted on and removed from the recorder without removing the reel from the cartridge. Additionally, the cartridge is constructed to cooperate with an automatic tape extractor of the type described in the application of Johannes K. Jäntzen, Eric K. Maxon and Andrew W. Hinman entitled "Tape Extractor Magnetic Tape Cartridge System," filed Oct. 26, 1972 and assigned to the same assignee as this application, the disclosure of which is incorporated herewith by reference.

A degree of standardization has been achieved in the recording industry which established basic widths in recording tape. The most common widths used in the United States are ¼ inch, ½ inch, ¾ inch and 1 inch. To a lesser extent certain prevalent standards have been created for the size of the storage reels and the reel hubs. In this respect, a degree of interchangeability of magnetic tape supply reels for various computer and recorder devices is achieved.

Often in the design of such devices variation from the prevalent standards must be incorporated to obtain certain beneficial features. Such variation, however, must not be so extensive as to preclude the use of tape reels conforming to the prevalent standards. In this manner, a preexisting stock or competitive supply can fulfill the requirements of the device.

SUMMARY OF THE INVENTION

The invented tape reel cartridge provides a storage enclosure for a conventional 8-inch tape reel for a 1-inch wide magnetic tape, and allows the tape reel to be adapted to a tape recorder system having an automatic tape extractor mechanism for self-threading as disclosed in the above referenced patent application. In this respect the cartridge is provided with an inner guide which is arranged around a portion of the periphery of the flanges of a contained reel. The guide provides a guide for an extractor mechanism of the type which extends a probe into the outer periphery of a reel for attaching onto the end of a tape wound thereon and extracting the tape from the reel.

Additionally, the cartridge is adapted for removable placement on a deck by an adapter ring which attaches to the hub of a contained reel and operates in combination with a drive spindle. In this respect the spindle is provided with a latch having fingers which automatically snap onto the adapter ring and retain the contained reel on the spindle when the cartridge is placed over the spindle.

DETAILED DESCRIPTION OF THE PREFERRED EMBODIMENT

Figure 1:
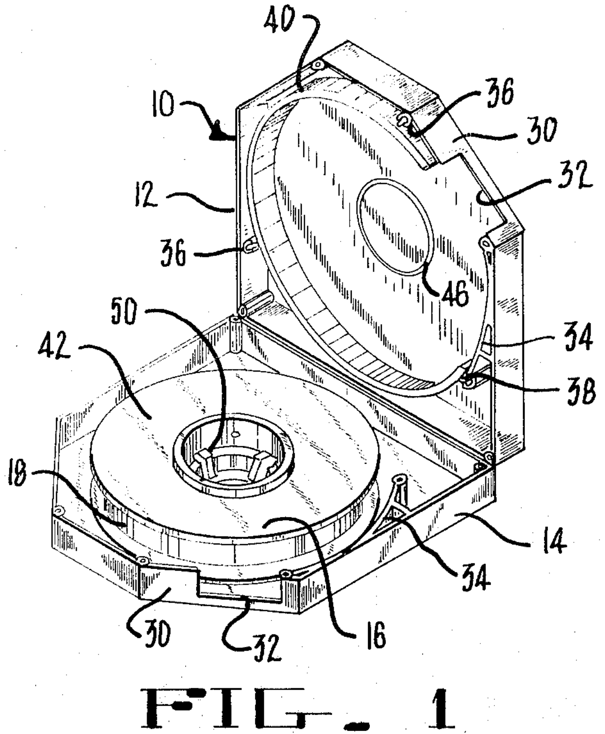
FIG. 1 is a perspective view of the cartridge on a cooperating spindle with a top half raised to reveal the internal arrangement of the cartridge and a contained tape reel.
Figure 4:
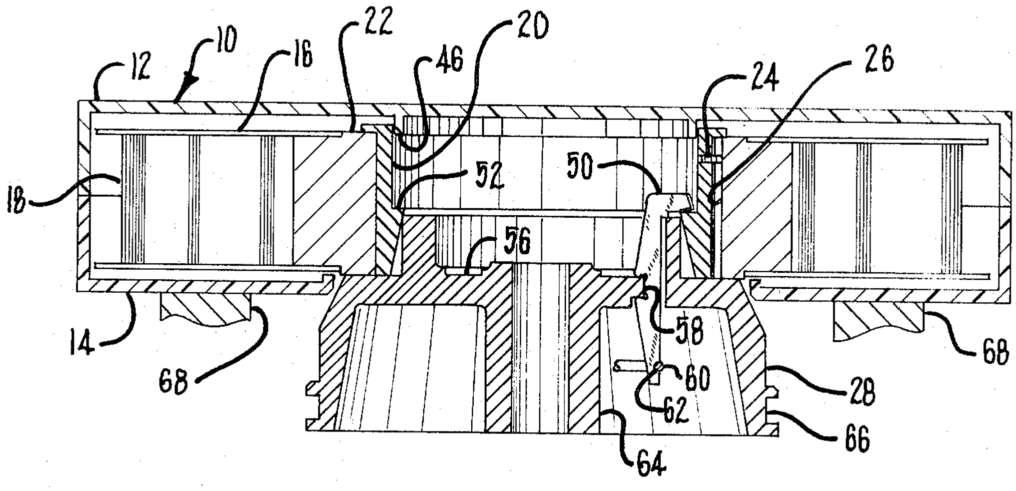
FIG. 4 is a cross sectional view of the cartridge and a contained reel mounted on the cooperating hub spindle of FIG. 1.

Referring to the perspective view of FIG. 1, a tape reel cartridge 10 is shown with a top half 12 opened over a bottom half 14. Contained in the cartridge is a conventional 8 inch magnetic tape reel 16 on which is wound a 1 inch wide magnetic tape 18. The top and bottom halves of the cartridge cooperate to form an enclosure for the tape reel for both storage and use. The tape reel is simply seated within the cartridge and rotatable therein. By properly seating the cartridge on a tape drive deck and seating the reel on a spindle hub, the reel can be rotated within the cartridge without contacting the top or bottom half of the cartridge. In this respect the tape reel 16 is preferably provided with an adapter ring 20 which is fastened to the hub 22 of the tape reel 16 by a plurality of set screws 24, as shown generally in FIG. 2, which engage each of three slots 26 in a common hub design of a conventional reel. The adaptor ring 20 seats on a hub spindle 28 and supports the reel as shown in FIG. 4 and described in greater detail hereinafter.

The tape cartridge 10 is fabricated from a plastic material in an injection molding process, and includes peripheral walls 30 with a matched exit opening 32 and a matched integral guide 34 formed in each half of the cartridge. In the top half of the cartridge are three keyway posts 36 in which locking tabs 38 of a circular guide 40 are insertable to position the guide around and within the periphery of a tape reel when the cartridge is closed.

Integral guide 34 is positioned adjacent the peripheral edge of a contained reel 16 and extends approximately 1/6 the circumferential distance around the reel. The guide 34 commences immediately adjacent the exit opening 32 and forms both a retainer for tape 18 wound on the reel and a guide for an extractor probe (not shown) which enters the cartridge to engage the end of the tape 18 or an attached leader or other device on the end of the tape for automatic extraction of the tape from the reel and cartridge as in the manner described in the referenced patent application.

Circular guide 40, as noted, is arrangeable around and within the peripheral edge of the flanges 42 of the tape reel 16. Since circular guide 40 commences at the end of the integral guide 34 and completely encircles the tape reel within or between the flanges, except at the exit opening, the guide must necessarily be displaceable to permit insertion of a tape reel in the cartridge. Insertion is accomplished by sliding the tabs 38 of the guide 40 into the keyway posts concurrently with placing the reel in the top half of the cartridge. Alternately, it has been found that removal of one of the tabs at either end of the circular guide, when the guide is constructed of a material such as plastic having a degree of flexibility, permits removal or insertion of the tape reel in the cartridge. While the circular guide is mounted to the top half of the cartridge in the mode contemplated, it may alternately be mounted in the bottom half of the cartridge.

Figure 3:
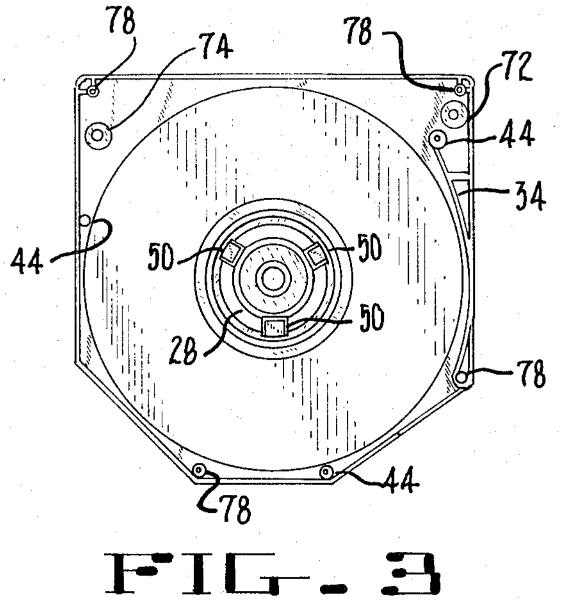
FIG. 3 is a plan view of the bottom half of the cartridge, the tape reel and hub spindle of FIG. 1.

To insure that the tabs are locked in the keyway posts when the cartridge is closed, three corresponding blocking posts 44 are mounted on the bottom half of the cartridge as shown in FIG. 3 and aligned to abut the keyway posts on closure.

The tape reel 16 is aligned and prevented from sliding in the cartridge by an integral circular ridge 46 in the top half 12 of the cartridge shown in FIG. 1. The ridge inserts into the inner periphery of the retainer ring 20 of the tape reel 16 when the cartridge is closed as shown in FIG. 4 thereby orienting the reel with respect to the cartridge.

A centrally located hole 48 in the bottom half of the cartridge provides an opening through which a tape reel drive spindle is insertable to engage a contained tape reel. To provide for easy removal of the cartridge, a preferred spindle arrangement has been devised.

Figure 2:
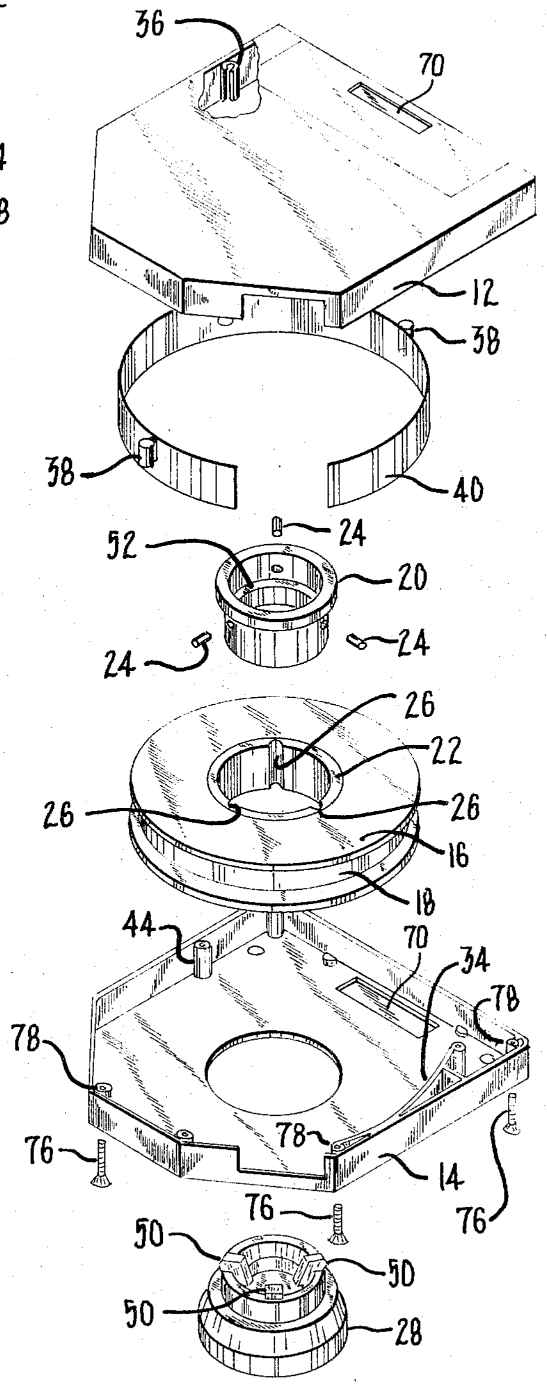
FIG. 2 is an exploded view of the cartridge, tape reel and cooperating hub spindle of FIG. 1.

The hub spindle 28 shown in the exploded view of FIG. 2 contains three latching fingers 50 which releasably engage an inner peripheral ridge 52 in the adapter ring 20 to secure the reel to the hub as shown in the sectional view of FIG. 4. With reference to FIG. 4, adapter ring 20, attached to the reel hub 22, is seated on the hub spindle 28. The three latching fingers 50 (one shown in FIG. 4) are equally spaced around an inner web portion 56 of the hub spindle and are each pivotally arranged on one edge of a hole 58 through the web portion 56. A bias to the pivotal fingers 50 is achieved by a flexible 0-ring 60 stretched in a slot 62 at the lower end of each of the fingers 50. Outward displacement of the upper ends of the fingers is limited by the core 64 of the spindle hub against which the lower end of each of the fingers contact when the reel is removed from the spindle. The upper ends of the fingers are beveled to allow the fingers to slide within the adapter ring 20, latch on the inner ridge 52 and most importantly, release when the cartridge and contained reel are lifted from the hub spindle.

In other respects the hub spindle 28 is conventional, being insertable on a shaft mounted to a deck and operable by a drive belt mountable on a belt guide 66 on the spindle.

When the tape reel is installed on the hub spindle 28 the cartridge 10 is preferably seated on a stationary support platform 68 mounted to a deck and so arranged in height that the contained tape reel is slightly elevated from the bottom half 14 of the cartridge for free rotation within the cartridge.

Other features aid in the convenient handling and operation of the cartridge. For example, the six sided configuration both conserves space on a recorder deck and insures a correct orientation thereon. Finger slot 70 in the bottom half provides a grip for lifting the cartridge from the deck and for general handling. A record interlock recess 72 and high energy interlock recess 74 may alternately be blocked for selective operation by appropriate recorder circuitry. And by securing the top and bottom halves of the cartridge with screws 76 through the remaining molded posts 78 in the two cartridge halves, the cartridge can be opened for removal or replacement of the contained tape reel.

With reference to the exploded view of FIG. 2, assembly of the cartridge system can be visualized. Adapter ring 20 is inserted in tape reel 16. Circular guide 40 is arranged around the reel 16, and the combination seated in the top half 14 of the cartridge. The bottom half 12 of the cartridge is then installed on the top half and secured by screws 76. The assembled cartridge may then be placed on the hub spindle 28 for operation with a recording machine such as a video tape recorder.

Figure 5:
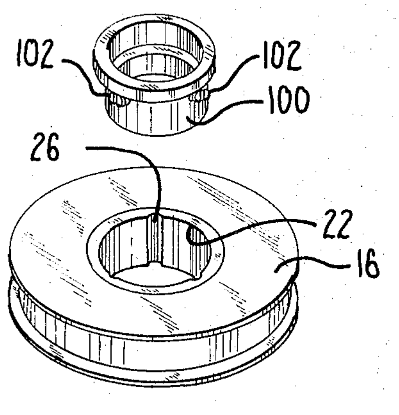
FIG. 5 is a perspective view of the tape reel and an alternate embodiment of an adapter ring.
Figure 6:
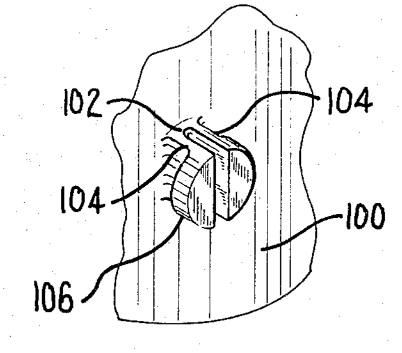
FIG. 6 is an enlarged fragmentary view of the adapter ring of FIG. 5.

To simplify the adaption of tape reels for the cartridge system described, the adapter ring 20 shown in FIG. 2 may be replaced by a modified adapter ring 100 as shown in FIGS. 5 and 6. With reference to FIGS. 5 and 6, the set screws of the above described adapter ring 20 have been eliminated and replaced by three integral wedges 102 spaced equidistantly around the adapter ring. The wedges 102 are flexible and, as shown in greater detail in FIG. 6, comprise two spaced fingers 104 projecting from the outer surface of the adapter ring 100. The spaced fingers 104 have enlarged ends 10 which engage the slots 26 in the inner surface of the hub 22.

The adapter ring 100 can be "popped" into the hub 22 of the tape reel 16. When the ring is inserted into the hub with the wedges 102 aligned to the three slots 26 in the hub, the ends of the fingers 104 are flexed together as the wedges slide into the slots. The adapter ring is retained in the hub by the force of the wedged fingers which additionally lock the reel from rotating relative to the adapter ring.

When constructed in this manner the adapter ring can be fabricated from a plastic for cost savings.

It is contemplated that additional modifications may be made to the invented tape reel cartridge without departing from the scope of the invention as defined in the claims.

I claim:

1. In a tape reel cartridge having a top, a bottom and side walls adapted to form an enclosure structure for containing a tape reel on which is wound a magnetic tape, wherein the enclosure structure has a first opening in a side wall through which a magnetic tape is extendible and a second opening in the bottom through which a drive spindle is insertable, the improvement comprising:

- a tape reel contained in said cartridge, said tape reel having a hub,
- a displaceable adapter ring inserted in said tape reel hub, said adapter ring adapted for releasable engagement by said hub spindle to support and rotate said tape reel in the cartridge,
- a first tape guide fixed to the enclosure structure, said first tape guide extending from immediately adjacent the first opening around a portion of the periphery of said contained tape reel, and
- a second tape guide displaceable from the enclosure structure, said second tape guide extending from said first tape guide, around and within the periphery of said contained tape reel and hence adjacent the first opening in the enclosure structure opposite said first guide.

2. The combination of claim 1 further comprising means for supporting said tape reel in spaced relation to, and out of contact with, said enclosure structure.

3. The combination of claim 2 comprising further an orientation guide formed in the top of the enclosure structure and engageable with said adapter ring for orienting said tape reel in the cartridge.

4. The combination of claim 1 wherein said tape reel hub has spaced slots and said adapter ring includes projecting members engageable with said slots when the adapter ring is inserted into the hub.

5. The combination of claim 4 wherein said projecting members are flexible wedge members.

6. The combination of claim 2 wherein said tape reel hub has spaced slots and said adapter ring includes projecting members engageable with said slots when the adapter ring is inserted into the hub.

7. The combination of claim 3 wherein said tape reel hub has spaced slots and said adapter ring includes projecting members engageable with said slots when the adapter ring is inserted into the hub.

8. The combination of claim 5 wherein said wedge members each comprise a pair of spaced flexible fingers with enlarged bulbous projecting ends which are engageable in said slots.

* * * * *